US007545559B1

(12) United States Patent
Lee et al.

(10) Patent No.: US 7,545,559 B1

(45) Date of Patent: Jun. 9, 2009

(54) DISPLAY METHOD APPLIED TO ELECTROPHORETIC DISPLAY

(75) Inventors: Cheng-Hao Lee, Hsinchu (TW); Hsin-Chung Chen, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 0 days.

(21) Appl. No.: 12/236,140

(22) Filed: Sep. 23, 2008

(30) Foreign Application Priority Data

Aug. 4, 2008 (TW) .............................. 97129572 A

(51) Int. Cl.
*G02F 26/00* (2006.01)

(52) U.S. Cl. ........................ 359/296; 359/290; 359/238; 345/107

(58) Field of Classification Search ................. 359/290, 359/296, 238, 265; 345/107

See application file for complete search history.

(56) References Cited

U.S. PATENT DOCUMENTS 7,019,889 B2 * 3/2006 Katase ........................ 359/296

* cited by examiner

*Primary Examiner*—Timothy J Thompson

(57) ABSTRACT

A display method applied to an electrophoretic display having pixels includes steps as follows. Firstly, a first frame is displayed on the pixels at a first time. Then the difference between the pixels at the first time and those at a second time predetermined for displaying a second frame is determined and part of the pixels corresponding to the difference are divided into a first pixel group (pg) and a second pg. The first pg shows a first single-color at the first time and a second single-color at the second time and the color shown by the second pg is opposite to that shown by the first pixel group. Next, a medium image is displayed on the first pg at a third time between the first and the second times and shows the second single-color. Afterwards, corresponding part of the second frame is displayed on the second pg at the second time.

3 Claims, 9 Drawing Sheets

DISPLAY METHOD APPLIED TO ELECTROPHORETIC DISPLAY

BACKGROUND

1. Field of the Invention

The present invention relates to a display method, and more particularly, to a display method applied to an electrophoretic display.

2. Description of the Related Art

FIG. 1 is a schematic cross-sectional view of a conventional electrophoretic display. FIG. 2 is a flow chart of a conventional display method applied to the electrophoretic display of FIG. 1. FIG. 3A is a schematic view of a first frame displayed by the eletrophoretic display of FIG. 1 at a first time. FIG. 3B is a schematic view of a second frame displayed by the electrophoretic display of FIG. 1 at a second time. Referring to FIG. 1, the electrophoretic display 100 includes a plurality of pixels 110 adapted to displaying frames. The electrophoretic display 100 has an electrophoretic layer 120 which includes a plurality of microcapsules 122 and the electrophoretic fluid 124 filled in each of the microcapsules 122. The electrophoretic fluid 124 filled in each of the microcapsules 122 includes the dielectric solvent 124*a* and a plurality of charged pigment particles 124*b* dispersed in the dielectric solvent 124*a*.

The conventional display method applied to the electrophoretic display includes the following steps. Firstly, referring to FIGS. 1, 2 and 3A, the step 101 is performed. The step 101 is that a first frame F11 is displayed on the pixels 110 at a first time. Then, referring to FIGS. 1, 2 and 3B, the step 102 is performed. The step 102 is that a second frame F12 is displayed on the pixels 110 at a second time later than the first time. When the electrophoretic display 100 displays the first frame F11 or the second frame F12, part of the charged pigment particles 124*b* in each of the microcapsules 122 move to a side of the electrophoretic display 100 such that the first frame F11 or the second frame F12 is displayed.

However, the dielectric solvent 124*a* is viscous such that the moving speed of each of the charged pigment particles 124*b* is limited. Thus, when the step 101 and the step 102 are performed according to the conventional display method applied to the electrophoretic display, a ghost image (the diagonal lines as shown in FIG. 3B) of the first frame F11 appears at the second frame F12 displayed by the electrophoretic display 100.

To solve the above problem, another conventional display method applied to the electrophoretic display is provided. FIG. 4 is a flow chart of another conventional display method applied to the electrophoretic display. FIG. 5A is a schematic view of a first frame displayed by the electrophoretic display of FIG. 1 at a first time. FIG. 5B is a schematic view of a white frame displayed by the electrophoretic display of FIG. 1 at a second time. FIG. 5C is a schematic view of a second frame displayed by the electrophoretic display of FIG. 1 at a third time. Another conventional method applied to the electrophoretic display includes the following steps. Firstly, referring to FIGS. 1, 4 and 5A, the step 201 is performed. The step 201 is that a first frame F21 is displayed on the pixels 110 at a first time. Then, referring to FIGS. 1, 4 and 5B, the step 202 is performed. The step 202 is that a white frame F22 is displayed on the pixels 110 at a second time later than the first time. Finally, referring to FIGS. 1, 4 and 5C, the step 203 is performed. The step 203 is that a second frame F23 is displayed on the pixels 110 at a third time later than the second time. However, according to another conventional display method, the above three steps must performed in order to switch the first frame F21 to the second frame F23, so the speed for switching frames is relatively low and the electrophoretic display 100 consumes more power.

BRIEF SUMMARY

The present invention is directed to provide a display method applied to an electrophoretic display which can improve the speeding for switching frames and reduce the power consumption of the electrophoretic display.

A display method applied to an electrophoretic display in accordance with an embodiment of the present invention is provided. The electrophoretic display has a plurality of pixels. The display method includes the following steps. Firstly, a first frame is displayed on all the pixels at a first time. Then the difference between all the pixels at the first time and all the pixels at a second time predetermined for displaying a second frame is determined and part of the pixels corresponding to the difference are divided into a first pixel group and a second pixel group. The second time is later than the first time. The first pixel group shows a first single-color at the first time and shows a second single-color at the second time. The second pixel group shows the second single-color at the first time and shows the first single-color at the second time. Next, a medium image is displayed on the first pixel group at a third time. The third time is between the first time and the second time and the medium image shows the second single-color. Afterwards, corresponding part of the second frame is displayed on the second pixel group at the second time.

In an embodiment of the present invention, the first single-color is black and the second single-color is white.

In an embodiment of the present invention, the first single-color is white and the second single-color is black.

According to the display method applied to the electrophoretic display of the embodiment of the present invention, only part of the second frame is updated when the first frame at the first time is switched to the second frame at the second time. Therefore, compared with the conventional arts, the display method applied to the electrophoretic display of the embodiment of the present invention can improve effectively the speed for switching frames and reduce the power consumption of the electrophoretic display.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present display method, in detail. The following description is given by way of example, and not limitation.

Figure 1:
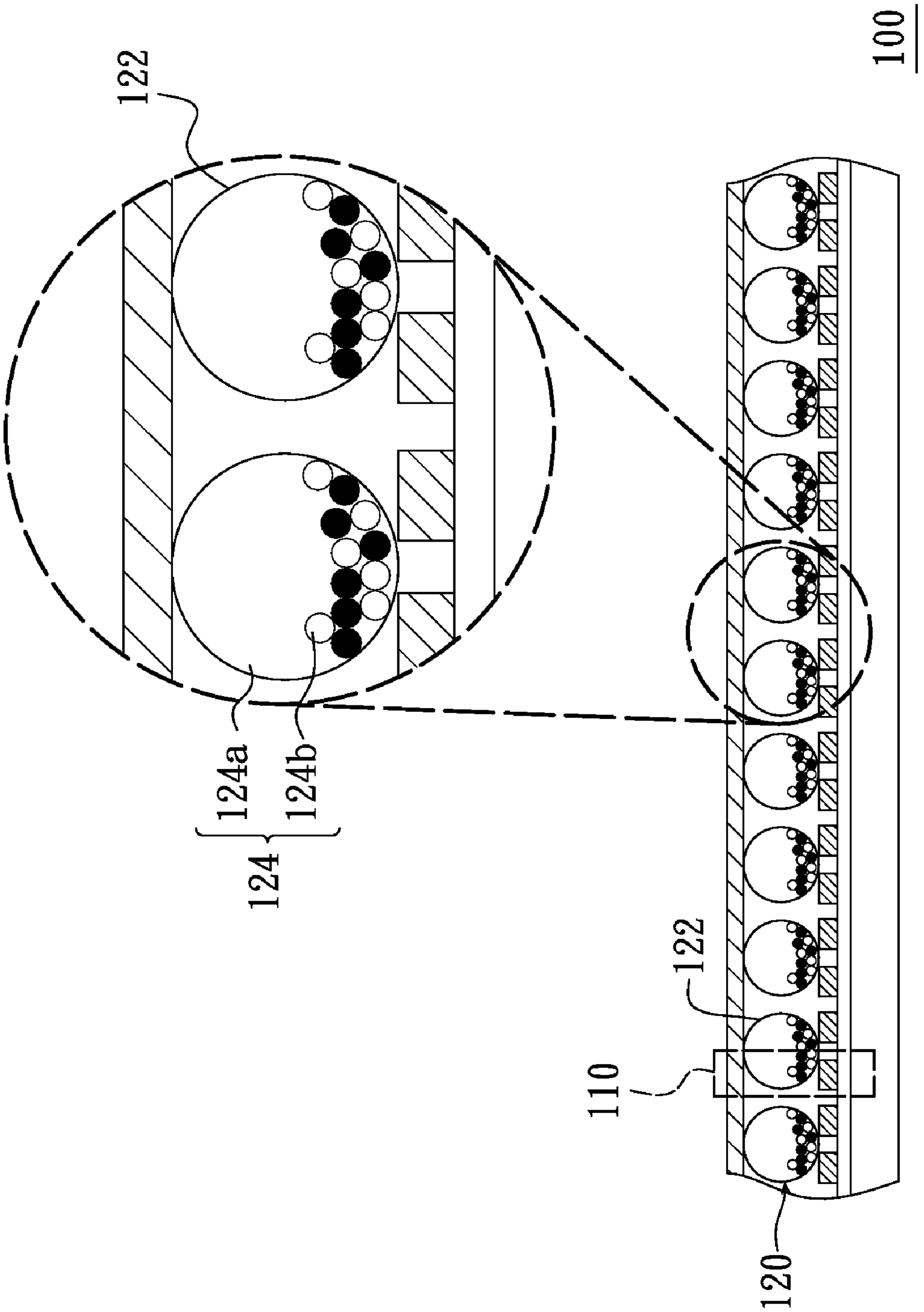
FIG. 1 (Prior Art)
FIG. 1 is a schematic cross-sectional view of a conventional electrophoretic display.
Figure 2:
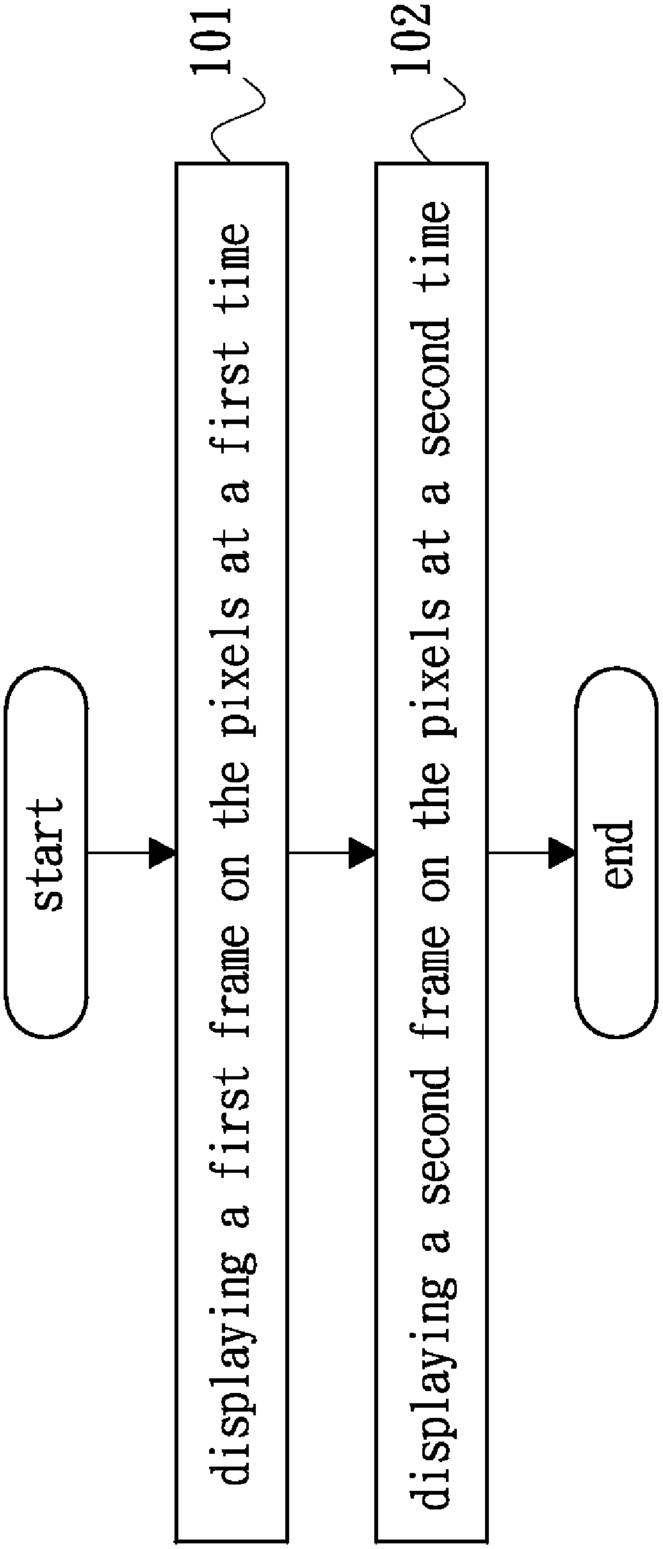
FIG. 2 (Prior Art)
FIG. 2 is a flow chart of a conventional display method applied to the electrophoretic display of FIG. 1.
Figure 3A:
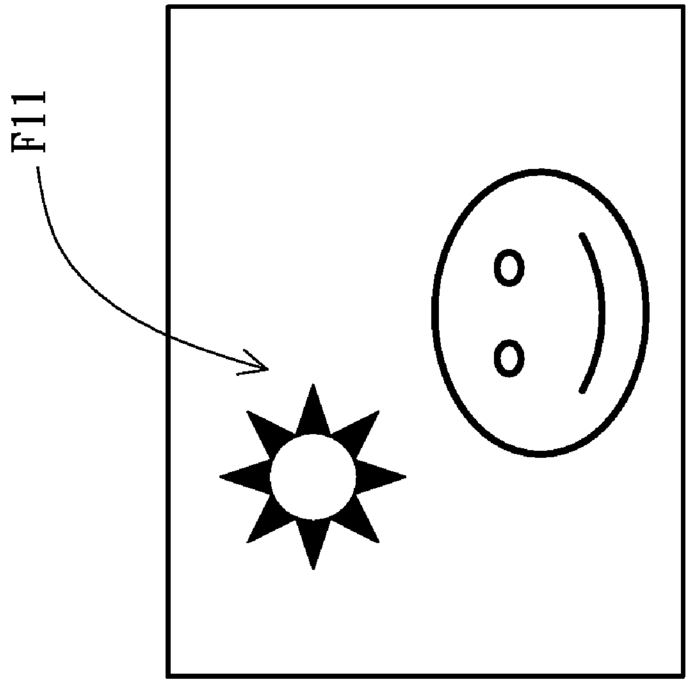
FIG. 3A (Prior Art)
FIG. 3A is a schematic view of a first frame displayed by the electrophoretic display of FIG. 1 at a first time.
Figure 3B:
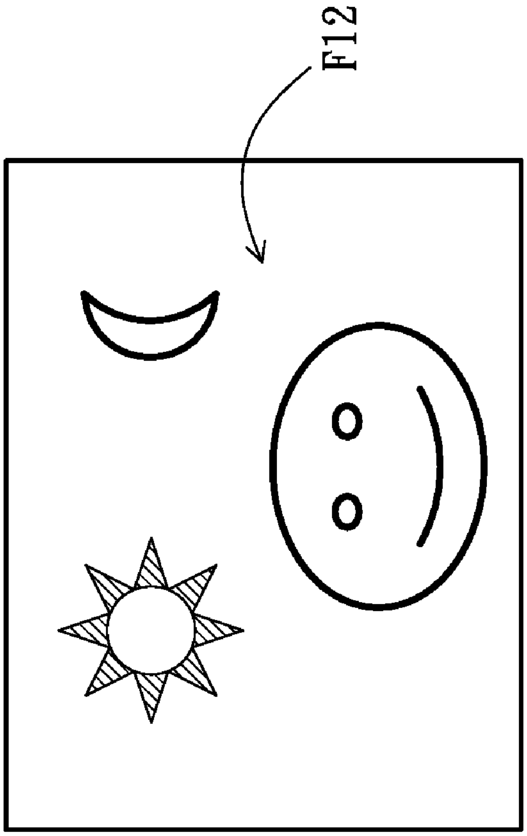
FIG. 3B (Prior Art)
FIG. 3B is a schematic view of a second frame displayed by the electrophoretic display of FIG. 1 at a second time.
Figure 4:
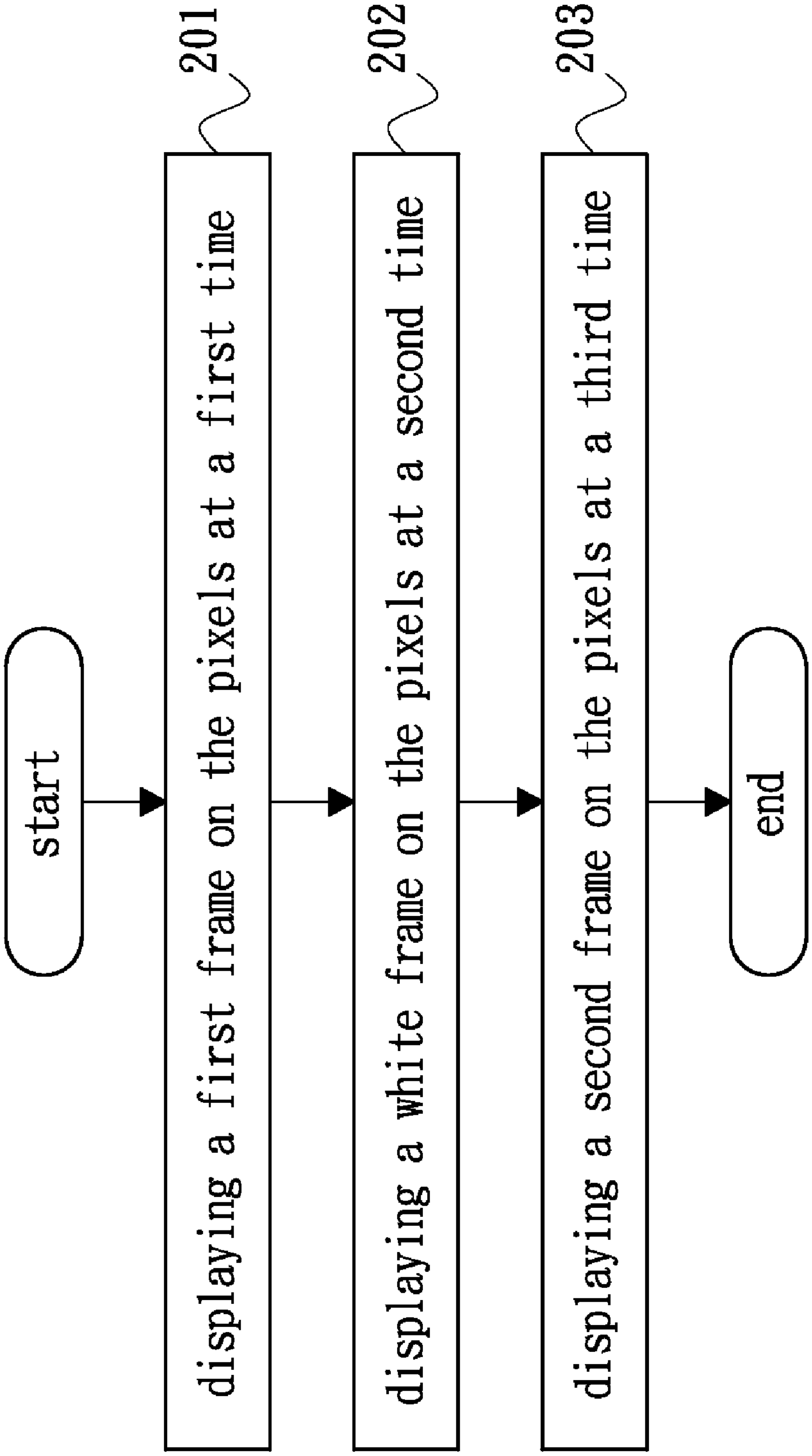
FIG. 4 (Prior Art)
FIG. 4 is a flow chart of another conventional display method applied to the electrophoretic display of FIG. 1.
Figure 5A:
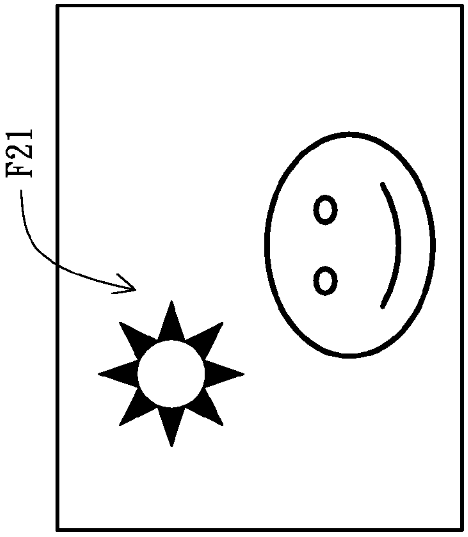
FIG. 5A (Prior Art)
FIG. 5A is a schematic view of a first frame displayed by the electrophoretic display of FIG. 1 at a first time.
Figure 5B:
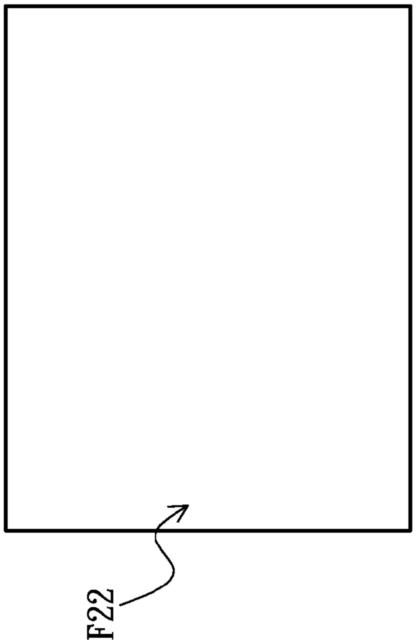
FIG. 5B (Prior Art)
FIG. 5B is a schematic view of a white frame displayed by the electrophoretic display of FIG. 1 at a second time.
Figure 5C:
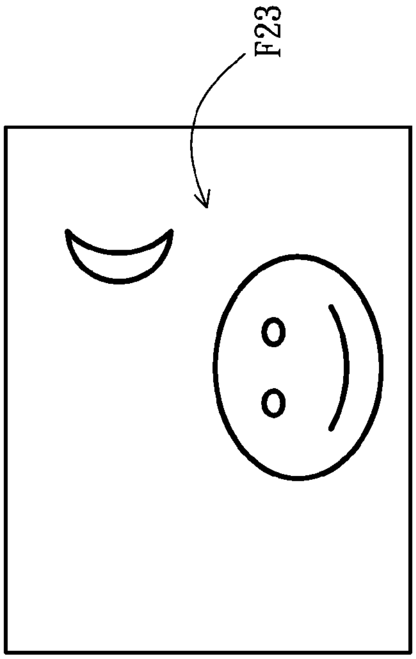
FIG. 5C (Prior Art)
FIG. 5C is a schematic view of a second frame displayed by the electrophoretic display of FIG. 1 at a third time.
Figure 6:
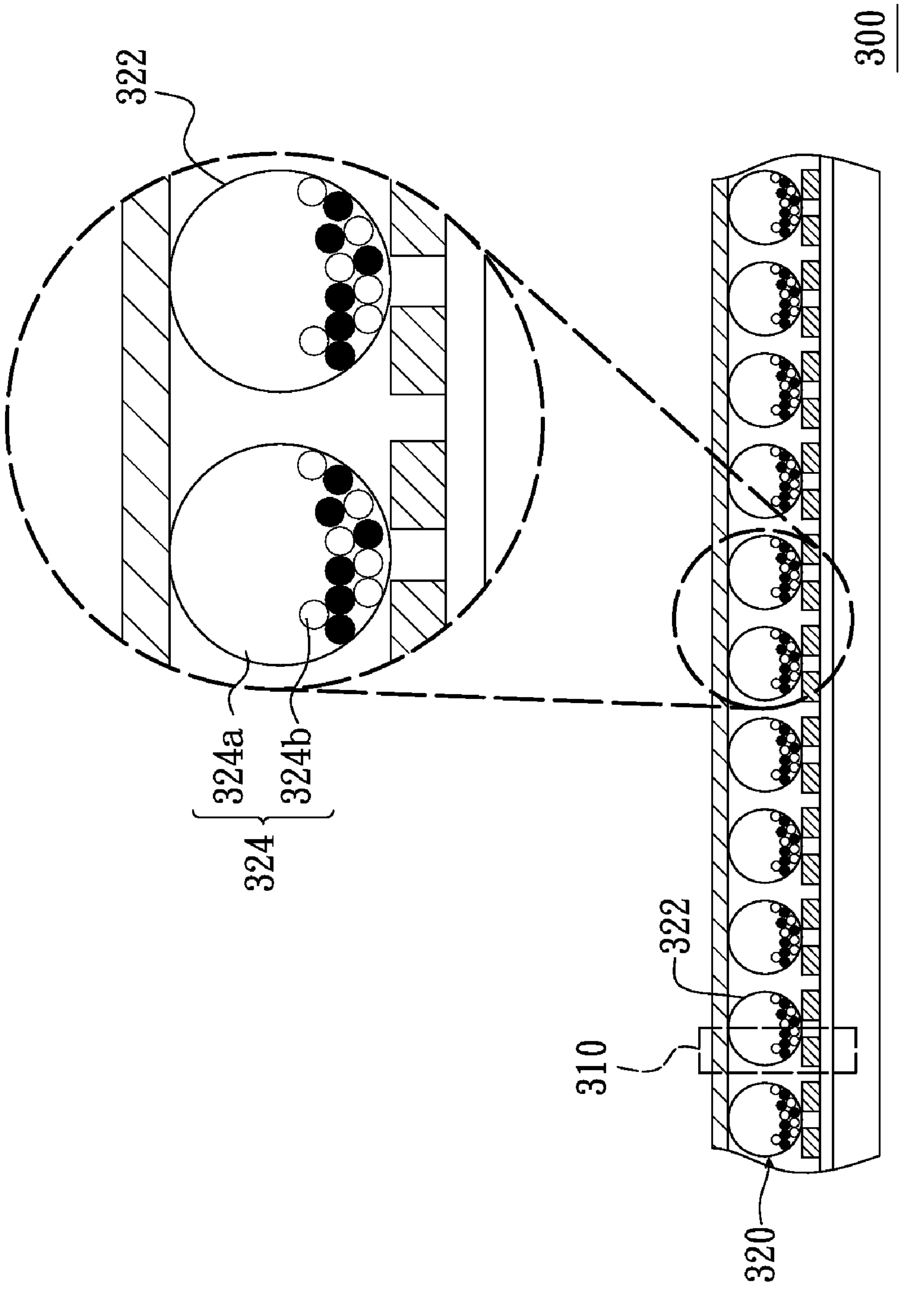
FIG. 6 is a schematic cross-sectional view of an electrophoretic display in accordance with an embodiment of the present invention.
Figure 7:
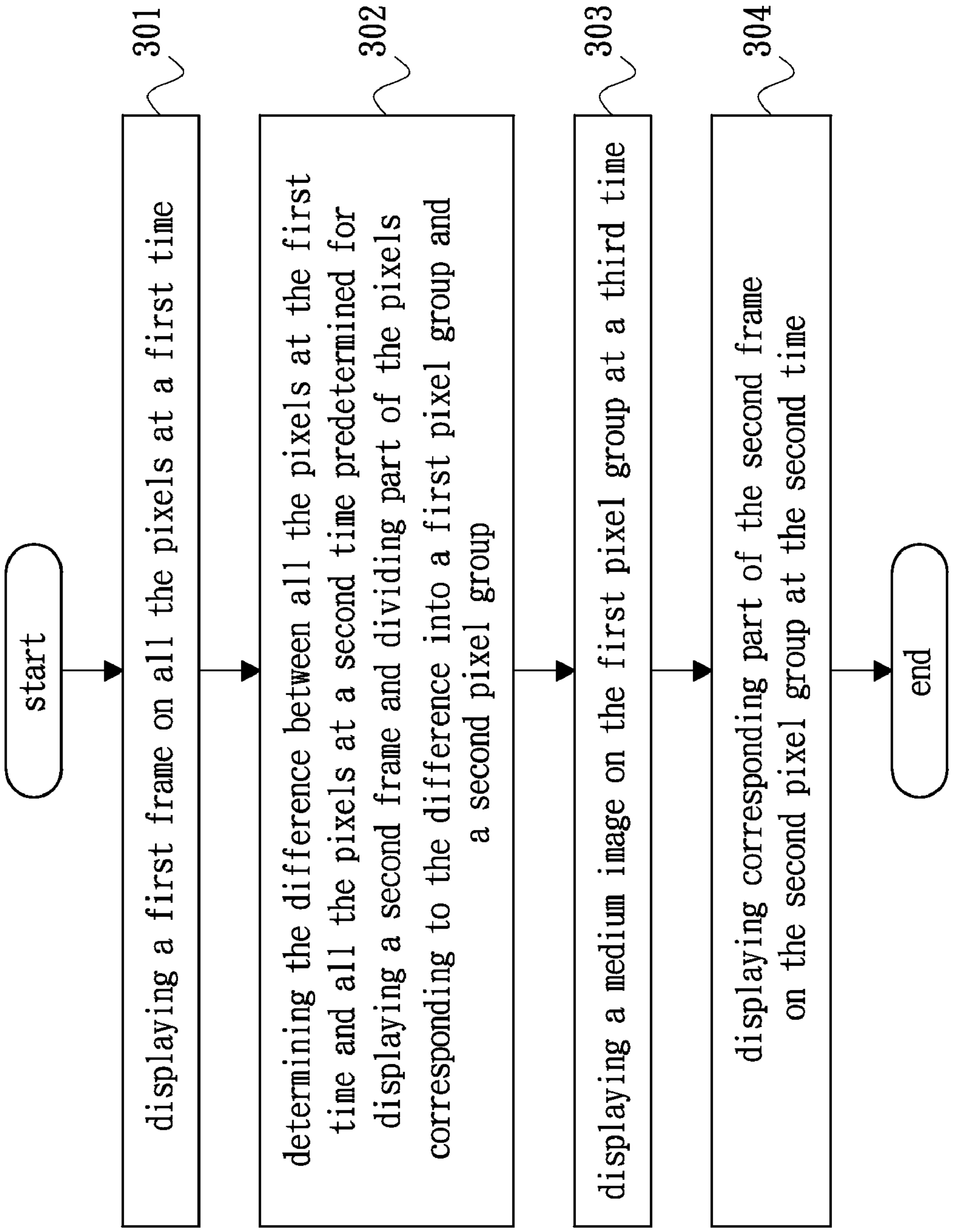
FIG. 7 is a flow chart of a display method applied to the electrophoretic display of FIG. 6 in accordance with the embodiment.
Figure 8A:
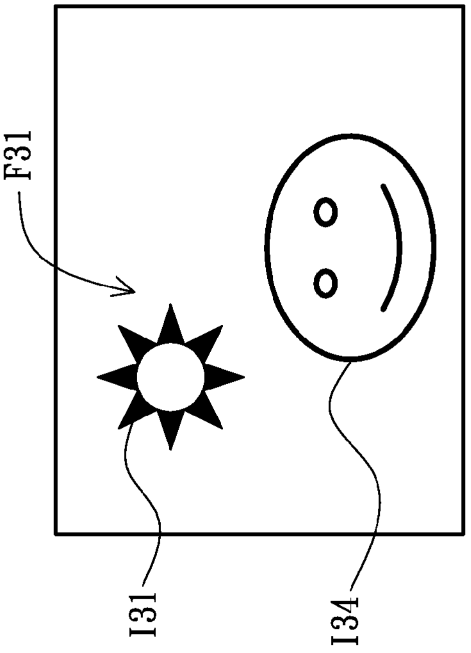
FIG. 8A is a schematic view of a first frame displayed by the electrophoretic display of FIG. 6 at a first time.
Figure 8B:
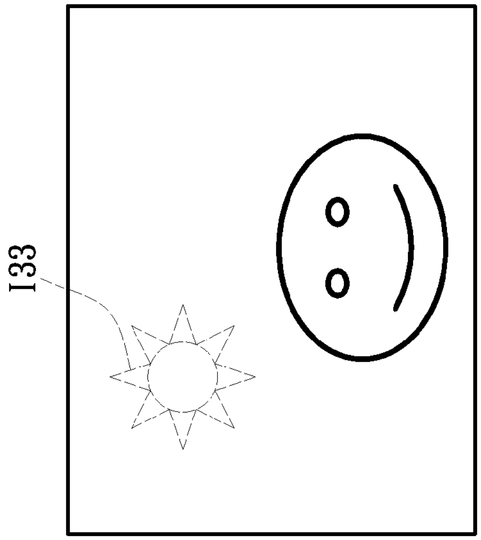
FIG. 8B is a schematic view of a medium image displayed by the electrophoretic display of FIG. 6 at a third time.
Figure 8C:
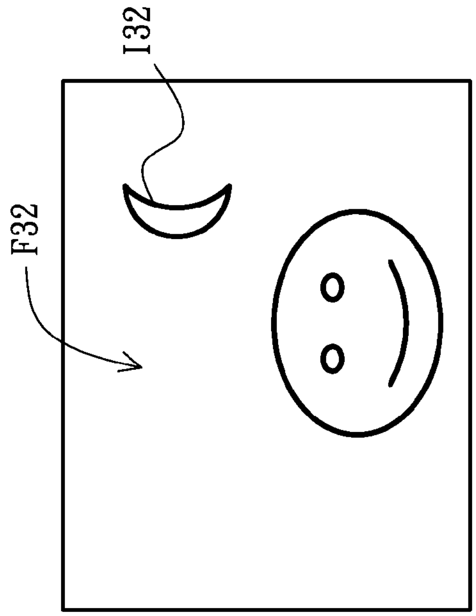
FIG. 8C is a schematic view of a second frame displayed by the electrophoretic display of FIG. 6 at a second time.

FIG. 6 is a schematic cross-sectional view of an electrophoretic display in accordance with an embodiment of the present invention. FIG. 7 is a flow chart of a display method applied to the electrophoretic display of FIG. 6 in accordance with the embodiment. FIG. 8A is a schematic view of a first frame displayed by the electrophoretic display of FIG. 6 at a first time. FIG. 8B is a schematic view of a medium image displayed by the electrophoretic display of FIG. 6 at a third time. FIG. 8C is a schematic view of a second frame displayed by the electrophoretic display of FIG. 6 at a second time.

Referring to FIG. 6, the electrophoretic display 300 includes a plurality of pixels 310 adapted to displaying frames. The electrophoretic display 300 includes an electrophoretic layer 320 having a plurality of microcapsules 322 and the electrophoretic fluid 324 filling in each of the microcapsules 322. The electrophoretic fluid 324 filled in each of the microcapsules 322 includes the dielectric solvent 324*a* and a plurality of charged pigment particles 324*b* dispersed in the dielectric solvent 324*a*. In addition, the microcapsule 322 of the embodiment may be replaced by a plurality of microcups. Furthermore, one side of each of the charged pigment particles 324*b* may be white and another side thereof may be black. The scope of the present invention is not limited herein.

It should be noted that each of the pixels 310 of the embodiment is defined as the minimum display unit of the electrophoretic display 300 and the minimum display unit is adapted to displaying a white image or a black image. All frames with different gray scales can be displayed by means of the pixels 310 defined as the minimum display units.

The display method applied to the electrophoretic display of the embodiment includes the following steps. Firstly, referring to FIGS. 6, 7 and 8A, the step 301 is performed. The step 301 is that a first frame F31 is displayed on all the pixels 310 at a first time. Then, referring to FIGS. 6 and 7, the step 302 is performed. The step 302 is that the difference between all the pixels 310 at the first time and all the pixels 310 at a second time predetermined for displaying a second frame F32 (as shown in FIG. 8C) is determined and part of the pixels 310 corresponding to the difference are divided into a first pixel group and a second pixel group. The second time is later than the first time.

It should be noted that the first pixel group shows a first single-color (such as black) at the first time and shows a second single-color (such as white) at the second time. Furthermore, the second pixel group shows the second single-color (such as white) at the first time and shows the first single-color (such as black) at the second time. In this embodiment, the first pixel group is a group of part of the pixels 310 displaying a sun image I31 as shown in FIG. 8A. The second pixel group is a group of part of the pixels 310 predetermined for displaying a moon image I32 as shown in FIG. 8C.

Next, referring to FIGS. 6, 7 and 8B, the step 303 is performed. The step 303 is that a medium image I33 is displayed on the first pixel group at a third time. The third time is between the first time and the second time. The medium image I33 (schematically indicated by the dotted lines in FIG. 8B) shows the second single-color (such as white). In other words, referring to FIGS. 8A and 8B, the sun image I31 of the first frame F31 is removed at the third time, that is, part of the first frame F31 is removed at the third time. It should be noted that at the third time, another part of the first frame F31 including a smile-face image I34 and a white ground image of FIG. 8A is still displayed on another part of the pixels 310 except the first pixel group.

Afterwards, referring to FIGS. 6, 7 and 8C, the step 304 is performed. The step 304 is that corresponding part of the second frame F32, that is, the moon image I32 is displayed on the second pixel group at the second time. It should be noted that at the second time, another part of the first frame F31 (including the smile-face image I34 and the white ground image of FIG. 8A) and the medium image I33 (as shown in FIG. 8B) are still displayed on another pate of the pixels 310 except the second pixel group. Therefore, on the whole, the second frame F32 is displayed at the second time.

To be brief, referring to FIGS. 8A to 8C, according to the display method applied to the electrophoretic display, the sun image I31 of the first frame F31 is firstly removed and then the moon image I32 of the second frame F32 is displayed.

According to the display method applied to the electrophoretic display of the embodiment, only part of the second frame F32 is updated when the first frame F31 at the first time is switched to the second frame F32 at the second time. Therefore, compared with the conventional arts, the display method applied to the electrophoretic display can improve effectively the speed for switching frames and reduce the power consumption of the electrophoretic display 300.

Figure 9:
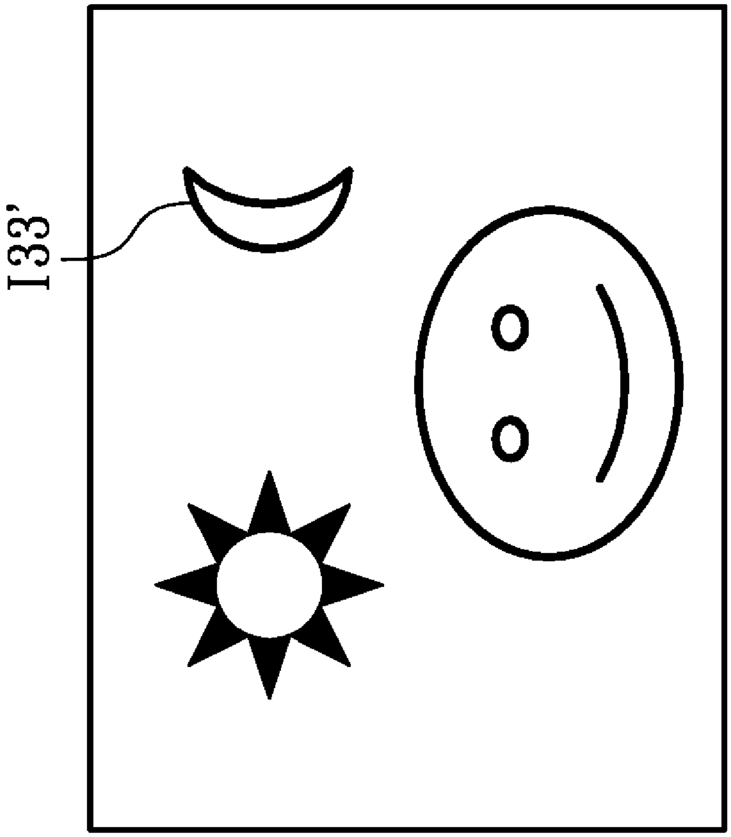
FIG. 9 is a schematic view of another medium image displayed by the electrophoretic display of FIG. 6 at the third time.

FIG. 9 is a schematic view of another medium image displayed by the electrophoretic display of FIG. 6 at the third time. Referring to FIGS. 6, 7, 8A, 8C and 9, in another embodiment, the first single-color shown by the first pixel group at the first time may be white and the second single-color shown by the first pixel group at the second time may be black. Furthermore, the second single-color shown by the second pixel group at the first time may be black and the first single-color shown by the second pixel group at the second time may be white.

In detailed, in this another embodiment, the second pixel group may be a group of part of the pixels 310 displaying the sun image I31 of FIG. 8A. The first pixel group may be a group of part of the pixels 310 predetermined for displaying the moon image I32 of FIG. 8C. In this embodiment, after the first time as shown in FIG. 8A, the display method applied to the electrophoretic display includes displaying the black medium image I33' as shown in FIG. 9 on the first pixel group at the third time (the step 303), and then displaying corresponding part of the second frame F32 on the second pixel group at the second time later than the third time (the step 304). It should be noted that the medium image I33' at the third time is the same as the moon image I32 (as shown in FIG. 8C) of the second frame F32 at the second time. That corresponding part of the second frame F32 is displayed on the second pixel group at the second time means that the sun image I31 (as shown in FIG. 8A) of the first frame F31 is removed.

To be brief, referring to FIGS. 8A, 9 and 8C in that order, according to the display method applied to the electrophoretic display of this another embodiment, the moon image I32 of the second frame F32 is firstly displayed and then the sun image I31 of the first frame F31 is removed.

According to the mentioned above, the display method applied to the electrophoretic display of the embodiment of the present invention at least has one of following advantages or other advantages. Only part of the second frame is updated when the first frame at the first time is switched to the second frame at the second time. Therefore, compared with the conventional arts, the display method applied to the electrophoretic display of the embodiment of the present invention can improve effectively the speed for switching images and reduce the power consumption of the electrophoretic display.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display method applied to an electrophoretic display, wherein the electrophoretic display has a plurality of pixels, the method comprising:

displaying a first frame on all the pixels at a first time;

determining a difference between all the pixels at the first time and all the pixels at a second time predetermined for displaying a second frame and dividing part of the pixels corresponding to the difference into a first pixel group and a second pixel group, wherein the second time is later than the first time, the first pixel group shows a first single-color at the first time and shows a second single-color at the second time, and the second pixel group shows the second single-color at the first time and shows the first single-color at the second time;

displaying a medium image on the first pixel group at a third time, wherein the third time is between the first time and the second time, and the medium image shows the second single-color; and displaying corresponding part of the second frame on the second pixel group at the second time.

2. The display method applied to the electrophoretic display as claimed in claim 1, wherein the first single-color is black, and the second single-color is white.

3. The display method applied to the electrophoretic display as claimed in claim 1, wherein the first single-color is white, and the second single-color is black.

* * * * *